350-376
SR
XR 3,466,635
SEARCH ROOM

INVENTOR.
SIMON MIDDELHOEK
BY Charles P. Boberg
ATTORNEY

3466635
OR IN 365/171

Sept. 9, 1969 S. MIDDELHOEK 3,466,635

MAGNETIC FILM STORAGE DEVICE WITH NONDESTRUCTIVE READOUT

Filed Feb. 15, 1966 7 Sheets-Sheet 6

Sept. 9, 1969 S. MIDDELHOEK 3,466,635

MAGNETIC FILM STORAGE DEVICE WITH NONDESTRUCTIVE READOUT

Filed Feb. 15, 1966 7 Sheets-Sheet 7

United States Patent Office 3,466,635
Patented Sept. 9, 1969

3,466,635
MAGNETIC FILM STORAGE DEVICE WITH NONDESTRUCTIVE READOUT

Simon Middelhoek, Adliswil, Zurich, Switzerland, assignor to International Business Machines Corporation, Armonk, N.Y., a corporation of New York Filed Feb. 15, 1966, Ser. No. 527,539
Claims priority, application Switzerland, Feb. 23, 1965, 2,473/65
Int. Cl. G11b 5/62
U.S. Cl. 340—174 3 Claims

ABSTRACT OF THE DISCLOSURE

Nondestructive readout is provided by means of a magnetic film storage element which is divided into alternately arranged hard and soft zones wherein the magnetization vectors normally are pointed in the same direction along an easy axis that extends transversely through the boundaries of all the zones. When this storage element is subjected to a read field applied substantially along the hard axis of the film, the vectors in the soft zones readily rotate into or toward their hard-axis positions, whereas the vectors in the hard zones rotate only slightly or negligibly by comparison so that the hard zones serve to restore the magnetizations of all zones when the read field terminates.

This invention relates to data storage cells of the magnetic film type, particularly those which are adapted to operate in a nondestructive readout, orthogonal switching mode.

Magnetic film cells for storage of binary information presently are being used in storage devices of data processing systems. The anisotropic films used have a preferred axis of magnetization, the so-called easy axis, whereby the magnetization of a film can assume either of two stable positions for selectively storing the binary values "1" and "0." The stored information can be read out by applying magnetic fields that cause a rotation or reversal of the film magnetization. When magnetic fields are applied in the direction orthogonal to the preferred axis, i.e., in the so-called hard direction, extremely rapid (of the order of nanoseconds) coherent rotational switching results, while fields applied parallel to the preferred axis cause a significantly slower (of the order of microseconds) wall switching and are thus unsuitable for use in data stores operating at extremely high speeds. In most storage devices presently being used the stored information normally is destroyed by the readout operation.

There also have been developed magnetic film cells and modes of operation thereof that permit nondestructive readout of the stored information. In some prior devices of this nature there are two films arranged above or beside each other whose easy axes are parallel, and two states of the films each characterized by the antiparallel positioning of the respective film magnetizations are used for information storage. The magnetization of one film, called the "switching film" or "read film," is rotatively switched into the hard direction by a read pulse fed to a word line running parallel to the easy axis of the films. Such switching produces an output pulse in a sense line running othogonally to the word line. The second or magnetically "harder" film, which will be called the "storage film," can be switched only by applying fields that are stronger or of longer duration than the read pulse, and it is only slightly deflected from the easy axis by a read pulse. The two films are so arranged that after the word pulse has ended, the magnetization of the read film is switched back into the direction antiparallel to the magnetization of the storage film by reason of the stray-field coupling between the films. This orientation of the magnetizations corresponds to the binary value that had been stored before the readout operation; hence, the operation is nondestructive.

A magnetic coupling of two films which tends to align the magnetizations of the films in antiparallel directions is called "negative" coupling. Double film cells with negative coupling have the disadvantage that the write operations, in which the magnetizations of the two films may have to be switched and aligned in antiparallel directions, require either relatively complicated write pulse sequences with elaborate circuitry and long write times, or an elaborate construction of the memory cell itself (a line being arranged between the two films). Strong stray-field coupling automatically causes the antiparallel alignment of the magnetizations, but since this orientation is accomplished by wall switching, the switching takes too much time for high-speed storage devices. Furthermore, in using double film cells with negative coupling, the sense signal is decreased in that, when the transverse read field is applied, the magnetization of the storage film is also slightly deflected from the easy direction, so that a voltage is induced in the sense line, arranged parallel to the hard direction, whose polarity is opposite to that of the voltage generated by the switching of the read film.

Read-only stores are known in which permanent magnets associated with individual magnetic film cells determine preferred directions of magnetization, each parallel to one of the two easy directions, that correspond to the binary values to be stored and to which the magnetization returns after the rotation caused by application of a read field; whereby nondestructive readout is obtained. These arrangements have the disadvantage that the fields specifying the stored information cannot be reversed electrically, which would be desirable for the convenient write-in of new information. There also are known certain kinds of magnetic film cells in which thin films of different coercivities are arranged one above the other and are separated by a nonmagnetic metallic layer, in which magnetic coupling tends to align the magnetizations of the films parallel to each other in the same direction. Coupling of the kind which causes the respective magnetizations of the films to be parallel (i.e., pointing in the same direction) commonly is described as "positive coupling," and in those instances where the positively coupled films are arranged in superposed relationship, it also may be referred to as "exchange coupling." The reason for the positive coupling achieved in this latter arrangement is not completely understood. It is assumed that it is caused either by diffusion of small particles of magnetic material into the nonmagnetic metal layer or by the action of the electrons in said layer.

An object of the present invention is to improve the construction and operation of magnetic film cells, particularly those of the nondestructive readout (NDRO) type, by employing the positive coupling principle to gain the attendant advanages of simple and economical fabrication, short-duration operating cycles and comparative insensitivity to disturbances.

A further object is to provide an improved NDRO storage device which enables the stored information to be readily changed by means of simple input circuitry.

A general object is to improve the techniques for making magnetic film cells, especially those of the NDRO type, so as to avoid the limitations of prior cells.

To attain the above-stated objects, it is herein proposed to fabricate a magnetic film in a manner such that it has interspersed zones of different magnetic properties arranged side-by-side along a common easy axis extending across the zone boundaries, so that said zones are positively coupled to one another and differ from each other in their rotational responses to transversely applied excitations, whereby different magnetic field strengths are required to rotate the respective magnetizations of the zones toward the hard direction.

The foregoing and other objects, features and advantages of the invention will be apparent from the following more particular description of preferred embodiments of the invention, as illustrated in the accompanying drawings.

In the drawings:

FIG. 1*a* is a schematic representation of a conventional single-layer thin magnetic film cell in conjunction with its input and output means.

FIG. 1*b* is the critical curve of such a cell.

FIG. 2*a* is a section through a film consisting of zones having identical dimensions but different magnetic properties in accordance with the invention.

FIG. 2*b* is a diagram illustrating the behavior of the magnetization and coupling field vectors in the various zones of such a film.

FIG. 2*c* is a diagram illustrating the magnetic flux present in the zones of said film.

FIGS. 3*a*, 3*b* and 3*c* are diagrams of the magnetization components $M_x$ in the easy direction vs. the magnetic field components $H_x$ acting in the direction of the easy axis, for:

(a) a conventional single film,
(b) a multizone film with $H_{B_x} < H_C$,
(c) a multizone film with $H_{B_x} > H_C$.

FIG. 4*a* is a section through a film consisting of zones of different thicknesses having different magnetic properties in accordance with the invention.

FIG. 4*b* is a diagram illustrating the behavior of the magnetization and coupling field vectors in the film of FIG. 4*a*.

FIG. 4*c* is a diagram illustrating the magnetic flux present in the zones of the film shown in FIG. 4*a*.

Figure 7A:
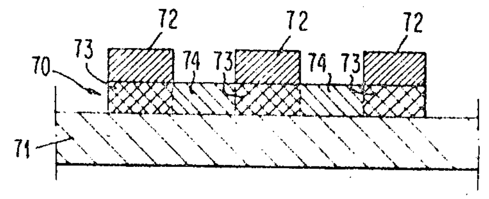

FIG. 7*a* is a section through an embodiment of a magnetic film cell constructed according to the invention.

Figure 7B:
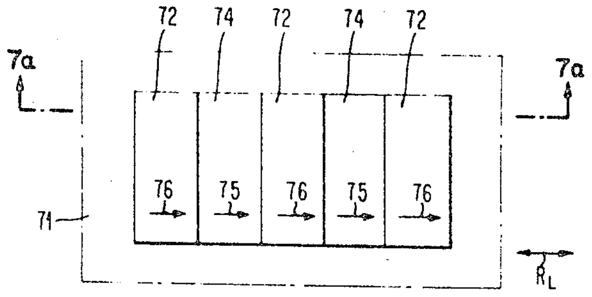

FIG. 7*b* is a plan view of said embodiment.

Figure 8A:
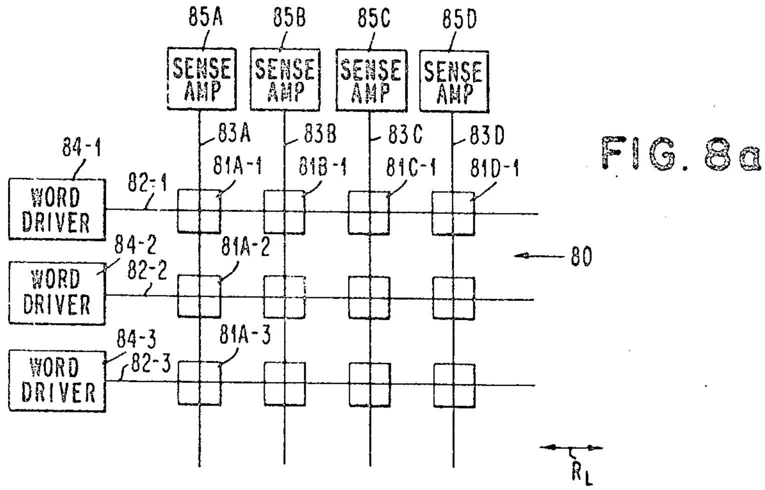

FIG. 8*a* is a schematic representation of a NDRO storage array built according to the invention.

Figure 8B:
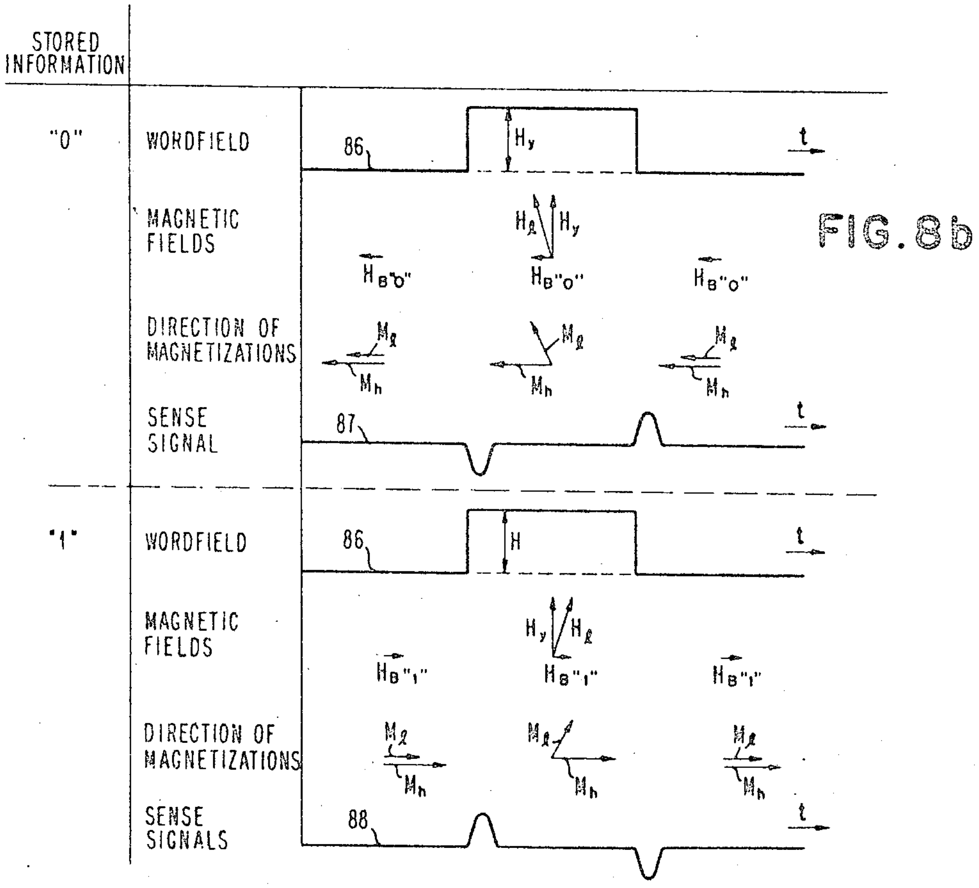
Figure 9A:
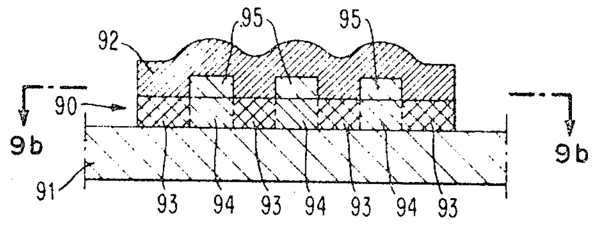
Figure 9B:
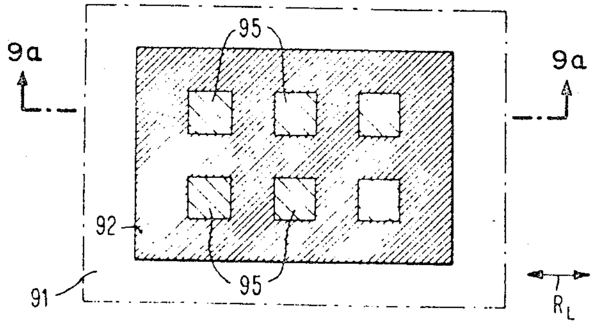

FIG. 8*b* is a diagram showing the behavior, during a read operation, of the field and magnetization vectors and the resulting sense signals for stored "0" and stored "1" magnetic film cell of the kind utilized in the array of FIG. 8*a*.

FIGS. 9*a*, 9*b*, 10*a*, 10*b*, 11*a* and 11*b* are sectional and plan views showing still other embodiments of magnetic film cells according to the invention.

Figure 1A:
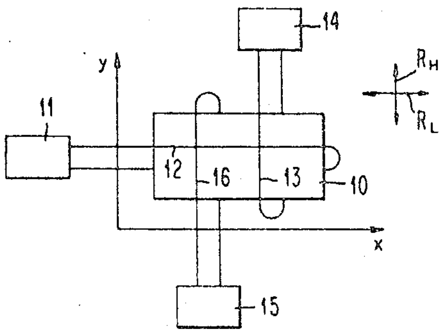
Figure 1B:
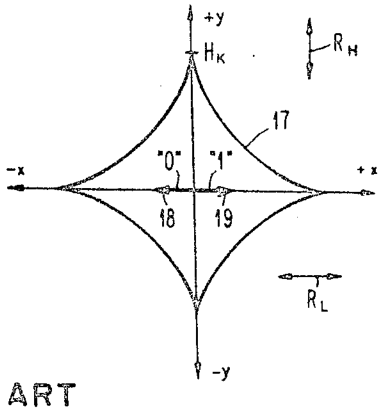

FIGS. 1*a* and 1*b* illustrate the construction and switching behavior of conventional single-layer thin magnetic film cells in a magnetic film memory operated in the so-called orthogonal field driving mode. FIG. 1*a* shows a thin magnetic film cell 10 whose easy axis $R_L$ is parallel to the *x*-direction determined by the input and output means. As is generally known, in the orthogonal field mode the magnetization of the film is rotated during readout and write-in at least approximately into the direction of the hard axis $R_H$ by a word field $H_y$ acting in the *y*-direction, which is generated by a pulse fed to word line 12 by word driver 11, and whose amplitude is larger than the saturation field strength $H_K$ (FIG. 1*b*). The film is thus magnetically saturated in its hard-axis direction. The voltage induced during readout in sense line 13 and passed to sense amplifier 14 is proportional to the change in the magnetization component in the *x*-direction, i.e., $dM_x/dt$, and its polarity is characteristic for the information stored in the cell. During write-in, an additional bit field applied orthogonally to the word field, i.e., in the *x*-direction, and generated by a pulse fed to bit line 16 by bit driver 15, determines by its polarity the binary value ("0" or "1") to be written in. The axes of the word, bit, and sense lines, usually designed as strip lines, define an orthogonal system of coordinates whose *x*-direction ideally lies parallel to the easy axis $R_L$ of the maghetic anisotropy of the film.

FIG. 1*b* shows the so-called critical curve 17, an asteroid, which, as is known, defines the magnetic switching behavior of a single-domain structure. In the rotational switching processes to be considered, single-domain behavior can be assumed for the magnetic films used, so that the asteriod thus also applies to these switching films. The *x*-axis of the asteroid corresponds to the easy axis $R_L$ of the film, and orthogonal to $R_L$ is the hard axis $R_H$.

Normally the stable states characterized by the alignment of the magnetization in one of the two directions of the easy axis are used for information storage. This is shown in FIG. 1*b* by the two arrows 18 and 19 designated "0" and "1." Rotational switching of the magnetization can be effected by magnetic fields larger than the values defined by the asteroid. For example, a field applied in the hard direction must exceed the value $H_K$ to make such switching possible. An additional field component in the direction of the easy axis is needed to cause unequivocal switching into one of the desired stable positions. These latter field components can be generated in different ways, e.g., by a bit pulse fed to bit line 16, or, as will be described in more detail, by the magnetic coupling between different films or zones of a thin magnetic film cell.

Figure 2A:
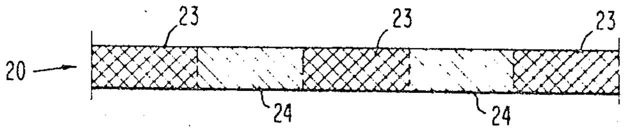
Figure 2B:
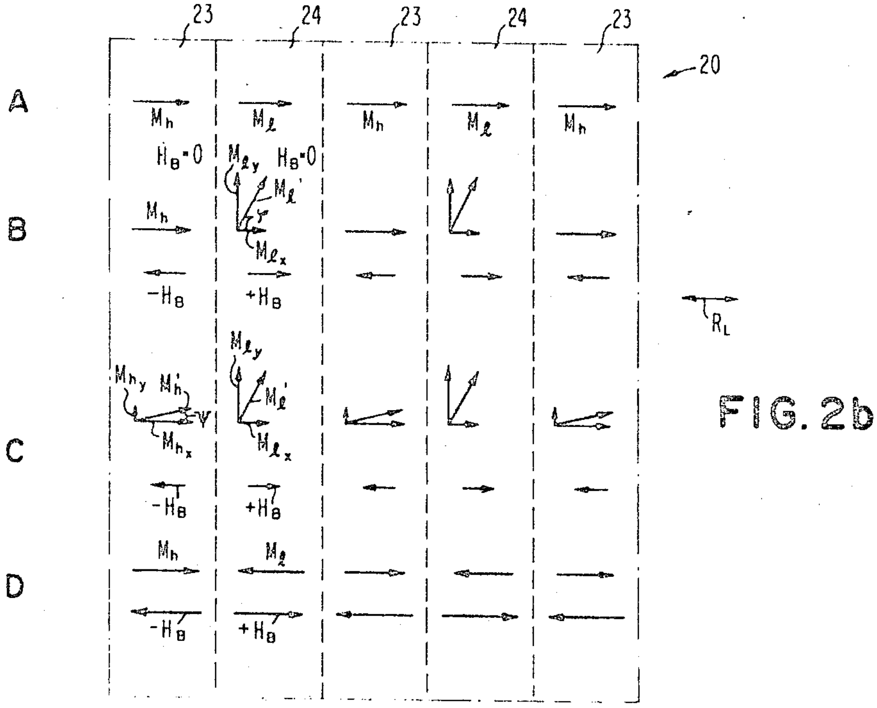
Figure 2C:
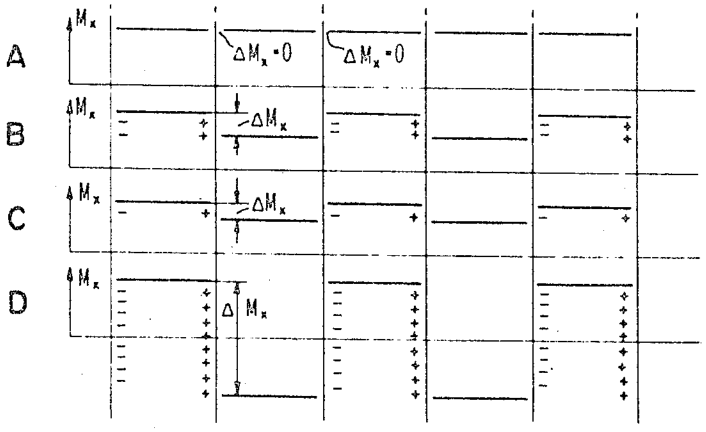

In the following description there first will be presented some basic explanations, illustrated by FIGS. 2*a* through 6, which are considered necessary for an adequate understanding of the positive magnetic coupling principle which determines the operation of the various magnetic film cells embodying the invention. FIG. 2*a* shows the partial cross section of a film 20 consisting of magnetizable material of uniform thickness. The film 20 can consist, for example, of 80% Ni and 20% Fe, and its thickness can be approximately 500 A. Let it be assumed that it is an anisotropic film and that the section through this film is parallel to the assumed easy-axis thereof. Let it be assumed further that the film 20 consists of several interspersed strip-shaped zones 23 and 24 extending parallel to the hard axis of the film and differing in their respective $H_K$ values, the "hard" zones 23 having a higher $H_K$ and the "soft" zones 24 a lower $H_K$. FIG. 2*b* is a diagrammatic plan view of part of this film under various conditions. (The behavior of the film at its edges will not be considered in detail since this is not necessary for an understanding of the operational mode.) When no external field acts on the film, the magnetizations of the hard ($M_H$) and the soft ($M_S$) zones are in the position shown in section A of the film, i.e., parallel to the easy direction +x. Assuming that for all zones the geometric dimensions, width and thickness, are identical, and that the flux density B is equal, then since $M_h = M_l$, the respective components $M_x$ of the magnetic flux, FIG. 2c, are also equal. ($\Delta M_x = 0$, as indicated in section A of FIG. 2c.)

Sections B of FIGS. 2b and 2c show the conditions existing when an external field $H_y$ is applied in the hard direction, where $H_y$ is larger than the $H_K$ value of the soft zones 24 ($H_{K_l}$) but significantly smaller than that of the hard zones 23 ($H_{K_h}$). The influence on the magnetization of the hard zones is neglected for the time being. The magnetization vector $M_l$ rotates into the position designated $M_l'$, forming an angle $\rho$ with the easy direction. The component $M_{l_y}$ parallel to the hard axis does not contribute to the magnetic coupling of the zones. It merely influences the conditions at the film edges lying parallel to the easy axis and therefore will not be considered here. The component $M_{l_x}$ in the easy direction is smaller by the factor cos $\rho$ ($M_{l_x} = M_l \cdot \cos \rho$) than $M_{h_x}$ ($= M_h$). The flux differences designated in section B of FIG. 2c with $\Delta M_x$ and emphasized by "+" and "−" symbols thus result at the zone boundaries. The resulting magnetic field lines from + to − pass partly through the air adjoining the film and through the ground plate (not shown), and partly through the film itself. The resultant fields thus produced in the film that affect the direction of the magnetization are shown in FIG. 2b by the coupling fields $+H_B$ (in the soft zones) and the demagnetizing fields $-H_B$ (in the hard zones).

Section C of FIGS. 2b and 2c again show the conditions occurring when an external field $H_y$ is applied. In contrast to the assumption made for sections B, that the magnetization $M_h$ remains unaffected by field $H_y$, the deflection of $M_h$ is here taken into account. It is assumed that the hard zones 23 show the same switching behavior (i.e., coherent rotational switching when $H_y > H_{K_h}$) as do the soft zones 24. The deflection of the magnetization $M_h$ by an angle $\psi$ caused by field $H_y$ results in a decrease of the x-component from $M_h$ to $M_{h_x} = M_h \cdot \cos \psi$. The incremental magnetism $\Delta M_x$, and accordingly the field strength $H_B$, are thus decreased.

Section D of FIGS. 2b and 2c show the magnetizations and fields when magnetizations $M_h$ and $M_l$ are in antiparallel positions in the absence of an external field. This state is unstable when the coupling field $+H_{B_x}$ exceeds the coercivity $H_C$ of the soft zones, as indicated in FIG. 3c.

Figure 3A:
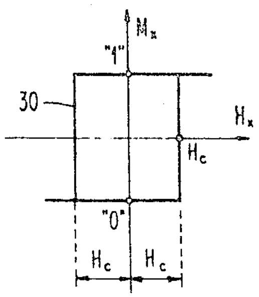
PRIOR ART FIG. 3a
Figure 3B:
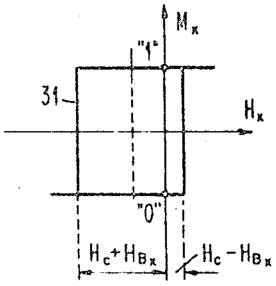
Figure 3C:
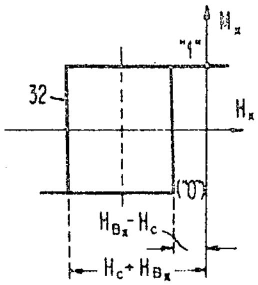

The curves representing the magnetization components $M_x$ vs. the field strength $H_x$ that are obtained when external fields are applied in the direction of the easy axis are shown for different films in FIGS. 3a through 3c. FIG. 3a shows curve 30 for a conventional homogeneous film. The intersections with the $H_x$ axis are symmetrical with respect to the $M_x$ axis. This means that the field strength $H_x$ required for switching the magnetization of such a film is approximately equal to the coercivity $H_C$ of the film material, both in switching from state "1" to "0" and in switching from "0" to "1."

FIG. 3b shows the corresponding $M_x = f(H_x)$ curve 31 for the soft zones 24 of the film of FIG. 2a. Here the fields applied must be so chosen that no switching takes place in the hard zones 23. The magnetization $M_h$ of the hard zones is aligned in the +x direction. Owing to the effect of the coupling field $H_{B_x}$, the curve is asymmetrical with respect to the $M_x$ axis. A preferred direction results for magnetization $M_l$. The field strength $H_x$ required for switching from "1" to "0" is $H_x = H_C + H_{B_x}$, i.e., greater than that required for switching from "0" to "1," which is $H_x = H_C - H_{B_x}$. Since $H_C > H_{B_x}$, the two positions "1" and "0" are stable.

FIG. 3c again shows the $M_x = f(H_x)$ curve 32 for the soft zones 24 of the film of FIG. 2a. In contrast to the case illustrated in FIG. 3b, it is here assumed that $H_C < H_{B_x}$, so that the position designated ("0") becomes unstable.

Figure 4A:
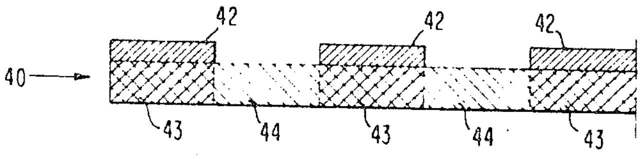
Figure 4B:
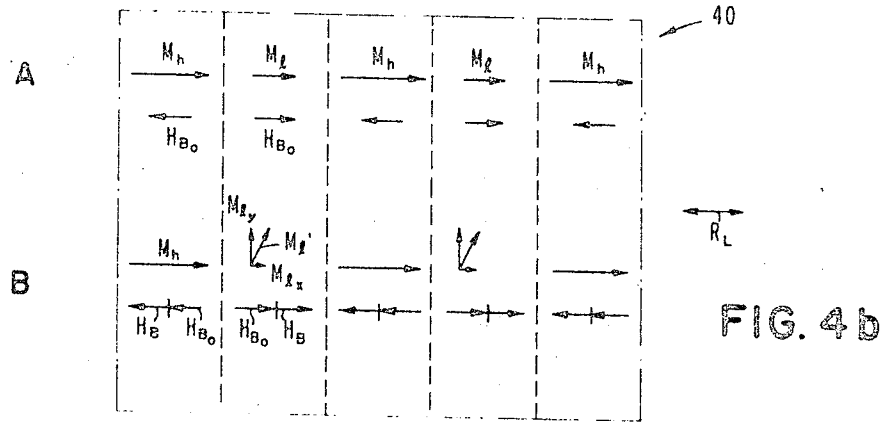
Figure 4C:
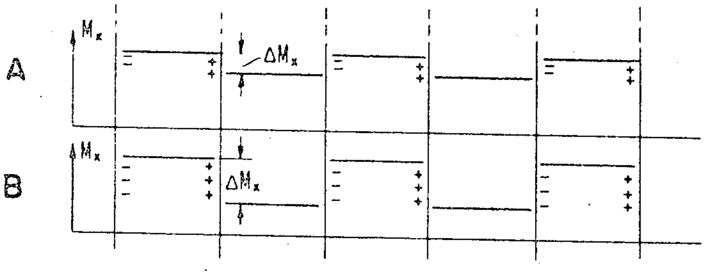

FIGS. 4a through 4c, like FIGS. 2a through 2c, show the structure of a film 40 with zones of different $H_K$ values, as well as the vectors of the magnetizations and the fields. In the structure shown here, however, each of the hard zones is composed of a strip-like portion 43 of the film 40 with a second film 42 placed on top thereof, so that the hard zones 42–43 are thicker than the intervening soft zones 44. As sections A of FIGS. 4b and 4c show, magnetic flux differences occur at the zone boundaries even when no external field $H_y$ is applied. This results in coupling field strengths $H_{B_0}$, to which are added the fields $H_B$ when a field $H_y$ is applied, as is shown in sections B. Similar conditions exist when the magnetic flux of the hard and soft zones is different. If the width of the hard and soft zones is different and the thickness equal, then $H_{B_0}$ becomes zero; but the value of the coupling and demagnetizing field strengths $+H_B$ and $-H_B$, respectively will differ.

Figure 5:
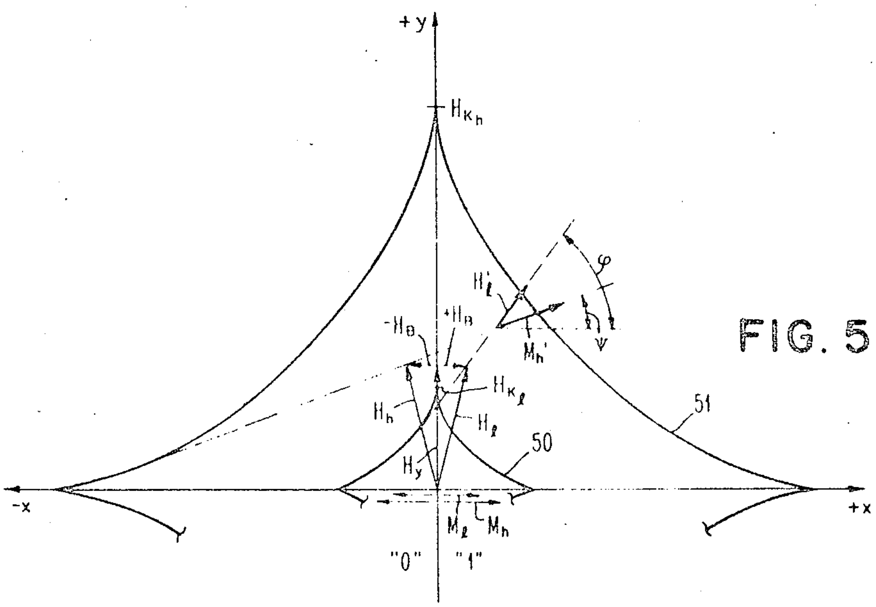
FIG. 5 shows the critical curves of the switching and storage zones of a multizone film where the zones are of identical dimensions, as in FIG. 2*a*.

FIG. 5 shows, for the film of FIG. 2a, the critical curves for the soft zones 44 (curve 50), henceforth called switching zones, and for the hard zones 42–43 (curve 51), called storage zones. As has been described hereinabove, owing to the coupling fields there is a preferred direction for the magnetization $M_l$ of the switching zones 44, i.e., parallel to the magnetization $M_h$ of the storage zones. The two stable states "$M_h$ and $M_l$ in direction +x" and "$M_h$ and $M_l$ in direction −x" can therefore be used for storing binary information, as indicated in the figure by "1" and "0." Let it be assumed that the magnetization vectors are at first in the position designated as "1." When a field of the order $H_{K_h} > H_y > H_{K_l}$ is applied (where $H_{K_h}$ and $H_{K_l}$ are the $H_K$ values of the storage and the switching zones, respectively) magnetization $M_l$ will be rotated at least approximately into the hard direction by angle $\rho$, while magnetizations $M_h$ are deflected only by the small angle $\psi$. It is here assumed that the material permits coherent rotational switching of the storage zones. Otherwise, unless the applied fields cause wall switching, the effect on the magnetization of the storage zones will be negligible. Owing to the magnetic coupling, coupling or demagnetizing fields $+H_B$ or $-H_B$ act in addition to field $H_y$, the resulting fields affecting the magnetization being designated $H_h$ and $H_l$. The resulting directions of magnetizations $M_h'$ and $M_l'$ are obtained in the known manner by drawing the tangents from the ends of the field vectors $H_h$ and $H_l$ to the corresponding asteroid (curve 51 or 50). If the coupling field $+H_B$ acting in the +x-direction were not present, the magnetizations $M_l$ of the switching zones would be entirely rotated into the hard direction (+y), after the $H_y$ field had terminated, there would thus be no field causing the magnetizations $M_l$ of all domains of the switching zones to return into either the +x or the −x-direction, so that antiparallel splitting of the domains would result. In the film shown in FIG. 2a, however, magnetizations $M_l$ return into their original position, since they had not been entirely rotated into the hard direction and so fall back into the "closer" easy direction, and since they are influenced by the coupling fields $+H_B$, which become zero only after complete return of the magnetizations into the easy direction. $M_h$ also returns to the easy direction.

This analysis shows that the coupling field strength $H_B$ present in accordance with the stored binary value ensures nondestructive readout of the stored information, since the magnetization of the film cell is returned into its original position after each readout operation.

Figure 6:
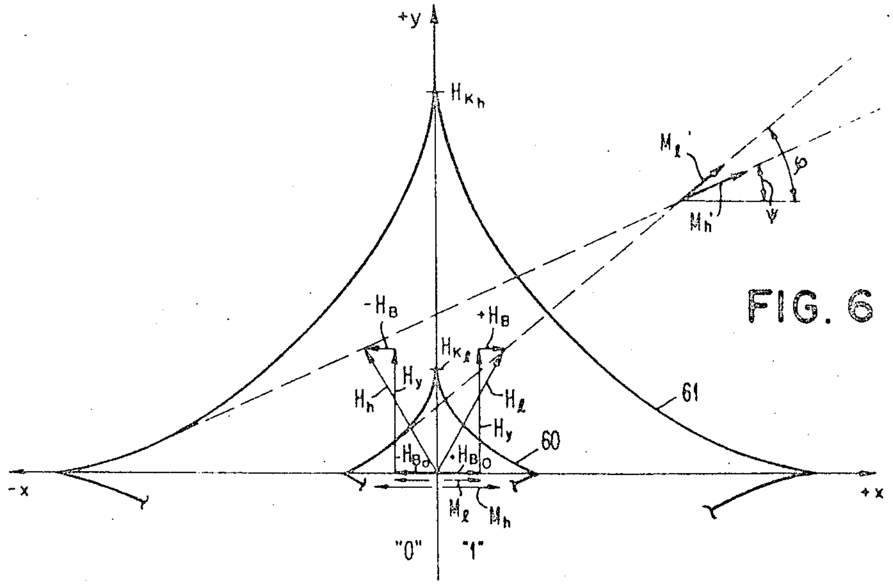
FIG. 6 shows the critical curves of the switching and storage zones of a multizone film where the zones are of different dimensions, as in FIG. 4*a*.

FIG. 6 shows, for the structure of FIG. 4a, the critical curves for the soft switching zones 44 (curve 60) and for the hard storage zones 42–43 (curve 61), and it illustrates the effect of the coupling fields $H_{B_0}$ which are shown in FIG. 4b.

FIG. 7a shows a thin magnetic film cell embodying the invention. A Ni-Fe layer 70 (80% Ni, 20% Fe) is deposited onto a polished ground plate 71 consisting of nonmagnetizable material, the film thickness being approximately 500 Å., and the coercivity $H_C$ of the film material approximately 3.5 oe. Strips 72 of a cobaltnickel film (60% Co, 40% Ni) are directly evaporated onto the Ni-Fe film 70 through a screen, the coercivity of these strips 72 being considerably higher than that of the Ni-Fe film 70, e.g., $H_C=13$ oe. The $H_K$ values of the two films are in about the same ratio as their $H_C$ values; i.e., the $H_K$ value of the Co-Ni film is considerably higher than that of the Ni-Fe film. Exemplary dimensions of the Co-Ni film 72 are: thickness 500 A.; strip width and distance between strips, both about $500\mu$. Since both the Ni-Fe and Co-Ni films are very thin and are in direct contact with one another, there is strong exchange coupling between them which prevents independent rotation of the magnetization in only one of the superposed film layers. As a result, the zones 73 of the Ni-Fe film 70 situated directly below the Co-Ni strips 72 also become magnetically hard, i.e., the effective $H_K$ and $H_C$ values increase in these zones 73. Film 70, then, consists of zones 74 with relatively low $H_C$ and $H_K$ values and intervening zones 73 with relatively high $H_C$ and $H_K$ values, whereby zones 74 and 73 can be used as switching zones and storage zones, respectively.

When a field $H_x$ is applied in the direction of the easy axis $R_L$, where the maximum value of $H_x$ is greater than the $H_C$ value of the switching zones 74 and smaller than that of the storage zones 72–73, a curve $M_x=f(H_x)$ corresponding to that of FIG. 3*b* results. The direction of the field strength $H_{B_x}$ determining the preferred direction depends on the orientation of the magnetization in the storage zones, which is not switched by the field applied. The field strength $H_{B_x}$ measured for the thin magnetic film cell described is 1.5 oe. It is easy to show that it is positive coupling which is involved i.e., that the magnetization of the switching zones 74 tends to align itself in a direction parallel to that of the storage zones 72–73. This is illustrated in FIG. 7*b* by the arrows 75 and 76 respectively representing the magnetizations in the various soft and hard zones.

When there is applied in the hard direction a field $H_y$ whose value lies between the $H_K$ values of the storage and the switching zones, the magnetization of the switching zones 74 will be rotated approximately into the hard direction (perpendicular to $R_L$), while that of the storage zones 72–73 will be only slightly deflected. The thin magnetic film cell shown in FIGS. 7*a* and 7*b* has basically the same behavior as that of the cells illustrated in FIGS. 2*a* and 4*a*.

Note that when the thin magnetic film cell described is used in a store having an orthogonal driving mode, different $H_K$ values of zones 73 and 74 are essential for the required formation of storage and switching zones, whereas different $H_C$ values, although advantageous, are not essential.

FIGS. 8*a* and 8*b* illustrate an embodiment of a NDRO storage array employing the magnetic film cell of the present invention. When such an array is operated as a read-only store (ROS), only read and no write operations take place. At the outset, however, it is necessary that the magnetization of the storage cells be aligned in accordance with the binary values which are to be stored and later read out. This write-in operation can be achieved electrically by applying sufficient strong fields ($H_y>H_{K_h}$). The required input circuits, being of an obvious design, are not shown.

FIG. 8*a* schematically shows the matrix arrangement of the store. Storage matrix 80 consists of thin magnetic film cells 81, each having the properties of the inventive cell described hereinabove, which are arranged in rows and columns. Word lines 82, parallel to the easy direction $R_L$ of the cells, and sense lines 83, orthogonal thereto, are arranged above these storage cells. The orthogonal arrangement of word and sense lines reduces inductive coupling between these lines, and thus the coupled noise signals, to a minimum. The store is word-organized; that is, in each read operation the bits of binary information stored in a number of cells constituting a word are read out simultaneously, the readout in this instance being nondestructive. As was described for FIG. 5, this requires, for each cell, the application of a field in the hard direction of approximately the value $H_{K_l}$. This field is generated by pulses fed to selected word lines 82 by word drivers 84, these word drivers being selected for operation in accordance with the address of the word to be read out. If, for example, the word driver 84-2 feeds a pulse to the word line 82-2, then the magnetizations $M_l$ (FIG. 8*b*) in the switching zones of the storage cells associated with that word line are rotated approximately into the hard direction. The change of the magnetization component lying in the easy direction (*x*-direction) that occurs in each cell associated with the word to be read out induces pulses in the respective sense lines 83 arranged above these cells, which pulses are amplified by sense amplifiers 85 respectively associated with the sense lines. During a readout operation each sense amplifier thus receives a pulse or pulse sequence whose polarity or phase is characteristic of the binary value ("1" or "0") in the corresponding bit position of the word read out.

FIG. 8*b* shows the magnetic fields acting on the switching zones of the cells during a readout operation, as well as the resulting rotations of the magnetization vectors of the storage zones ($M_h$) and the switch zones ($M_l$). This figure is based on the assumption that a stored binary "0" is characterized by the alignment of the magnetizations $M_h$ and $M_l$ in the $-x$-direction and that the binary "1" corresponds to their alignment in the $+x$-direction. The coupling fields influencing the magnetization of the switching zones in the $-x$ and the $+x$-directions are designated $H_{B''0''}$ and $H_{B''1''}$ respectively, and the word field generated by the word pulse is designated $H_y$. $H_l$ is the resulting effective field for the switching zones of the film. Curve 86 represents amplitude-time variation of the word pulse fed to one of the word lines 82. Curves 87 and 88 respectively represent on a time scale the voltages induced in sense lines 83 for a "0" and a "1" stored in the associated storage cell. This output voltage is led to a discriminator circuit (not shown) to determine the binary value of the bit which was read out, according to the polarity or phase of the voltage.

The read-only store just described can be expanded or modified into a semipermanent type of nondestructive readout store—i.e., a store with high-speed readout capability whose stored information can be changed by lower-speed write operations—by providing permanent write-writein circuitry which permits switching the storage zones of the thin magnetic film cells as desired. Since the write-in of new information is done only occasionally, it need not be performed at high speed. The necessary switching circuits therefore are inexpensive, even when common bit-sense lines cannot be utilized for both writing and reading. For using these cells in a type of nondestructive readout (NDRO) store wherein the write-in operations must also be performed very rapidly, it is necessary to decrease the $H_K$ andw $H_C$ values of the storage zones of the thin film cells. Since a certain ratio of the $H_K$ and $H_C$ values of the switching and storage zones must be maintained, very low $H_K$ and $H_C$ values become necessary for the switching zones (e.g., $H_K=0.5$ oe., $H_C=0.2$ oe.). Methods are known, however, for obtaining such values.

FIGS. 9*a* through 11*b* illustrate several other magnetic film cells embodying the invention. In the embodiment shown in FIGS. 9*a* and 9*b*, a Ni-F film 90 about 400 A. thick is deposited onto a polished ground plate 91. The coercivity of the film material is 3.0 oe. SiO films 95, which are about 50 x $50\mu$ in dimension, are deposited through a screen onto the film 90. These SiO squares 95 are arranged in rows and columns on the film 90 at a distance of about $50\mu$ from each other. Film 92 consists of Co-Ni and has a coercivity of 13 oe., being about 400 A. thick. In the zones 93 of film 90 where there is direct contact between the Ni-Fe film 90 and the Co-Ni film 92, the $H_K$ and $H_C$ values increase owing to the exchange-coupling effect of the magnetically hard Co-Ni film 92. The SiO film spots 95 magnetically decouple the films 92 and 90 so that the zones 94 of the Ni-Fe film 90 covered by the SiO film spots 95 are practically unaffected by the hard film 92. In this embodiment the film 90 (like the film 70 in the thin film cell illustrated in FIG. 7*a*) has zones with different $H_C$ and $H_K$ values. Zones 93, FIG. 9*a*. can serve as storage zones and zones 94 as switching zones. As in the foregoing embodiments, there is positive coupling between the storage and switching zones. The field strength $H_{B_x}$ (FIG. 3*b*) is 2.5 oe.

Figure 10A:
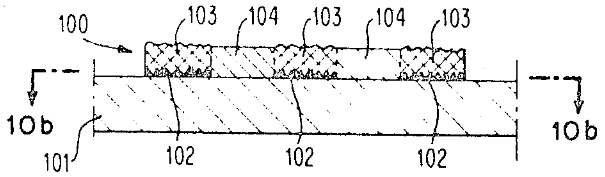
Figure 10B:
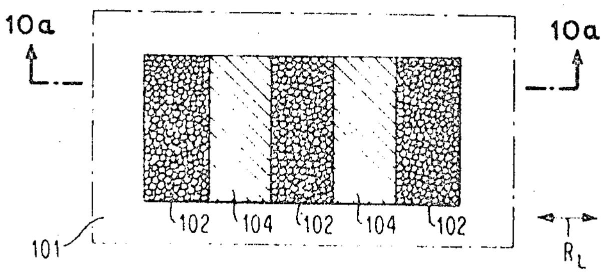

In the embodiment shown in FIGS. 10*a* and 10*b*, thin strip-shaped silver layers 102 about 200 A. thick are evaporated through a screen onto a polished ground plate 101. A Ni-Fe film 100 about 500 A. thick with a coercivity of 1.5 oe. then is deposited on the plate 101, covering the silver strips 102. In zones 103 the Ni-Fe film 100 and the ground plate 101 are separated by the silver layer 102, which is so thin that it does not form a continuous layer but consists of a number of microscopically small "islands." Thus, the Ni-Fe film 100, in effect, is vapor-deposited onto a surface roughened by the silver at 102, and since the thickness of the Ni-Fe film 100 (which also is relatively thin) is approximately constant, both the contact surface and the upper surface of the Ni-Fe film are uneven in the contact zones 103. The stray magnetic fields that result from this roughening of the surfaces cause an increase in the $H_C$ value of the film 100. An $H_C$ of 55 oe. has been measured in a device of this kind. The silver here serves only for roughening the surface. Such roughening can be accomplished in other ways, e.g., by etching or mechanically abrading the surface of the plate 101 in the desired places. Owing to the higher $H_C$, the direction of the molecular magnetization depart further from the measurable direction of the total magnetization of the film, which remains unchanged. This entails an increase in the field strength required to rotate the entire magnetization into the hard direction. Macroscopically, such a film corresponds (in its zones 103) to a film with high $H_K$. In zones 104 the Ni-Fe film 100 is in direct contact with the polished surface of ground plate 101, and here the magnetic properties of the film remain unchanged. In this embodiment, therefore, the film 100 (like the film 70 of the thin film cell illustrated in FIG. 7*a*) has zones of different magnetic properties. Zones 103 can serve as storage zones, and zones 104 as switching zones. There is positive coupling between these zones, the field strength being measured as 1.25 oe.

Figure 11A:
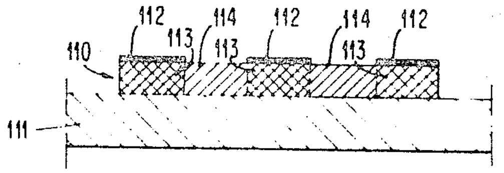
Figure 11B:
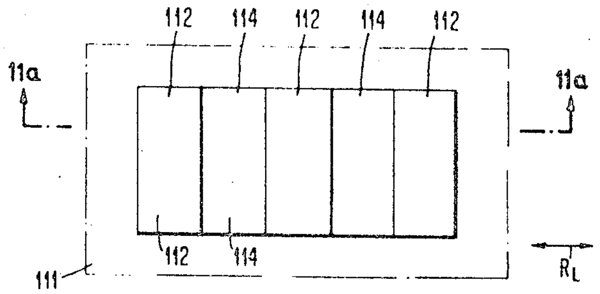

In the embodiment shown in FIGS. 11*a* and 11*b*, a continuous Ni-Fe film 110 about 500 A. thick is deposited onto a polished ground plate 111. Thin strip-shaped copper layers 112 are evaporated onto film 110 through a screen. A temperature increase after deposition causes diffusion of the copper 112 into the Ni-Fe film 110, resulting in a local increase of the $H_C$ value in the zones 113 of film 110 and thereby an increase in the field strength required for rotating the magnetization of the material into the hard direction in those zones. The unaffected zones 114 of the Ni-Fe film 110 are interspersed with the zones 113. In this embodiment, film 110 (like film 70 of the thin film cell illustrated in FIG. 7*a*) has zones of different magnetic properties. Zones 113 can serve as storage zones and zones 114 as switching zones. It will be noted that there is positive coupling between these different zones as in the case of the previously described embodiments.

The invention has been described with reference to several preferred embodiments. It should be noted that the structures, dimensions, and materials selected herein for illustration are merely representative. Thin film cells having other values (e.g., of the coupling field strength), appropriate for a given application, can be produced by changing the relevant dimensions (film thickness, width, length, or the placing of the film spots deposited through a screen) and by the choice of $H_C$ and $H_K$ values of the films used. In producing these thin film cells, for example, the processes described in the following references can be used to obtain the desired $H_C$ and $H_K$ values:

$H_C$ value: Nature, 194 (1962), page 1035, and IBM Research Report RZ 154 (1964).

$H_K$ value: Proceedings of the Intermag Conference, 1964, chapter 9.3.

In the case of the embodiments illustrated in FIGS. 10*a*–11*b*, the hardening materials mentioned above, e.g., the silver serving to roughen the ground plate and the copper used for diffusion, can be replaced by other materials, e.g., the silver by aluminum and the copper by gold. Also, the films described as consisting of 80% Ni and 20% Fe, and of 60% Co and 40% Ni, can be of different compositions.

While a read-only store (FIG. 8*a*) was chosen as an embodiment in which the magnetic film cells of the invention can advantageously be used, other storage arrangements, such as stores with high-speed read and write operations, can also be devised to utilize cells according to the invention which merely have different values than those in the examples described.

All of the embodiments disclosed herein are characterized by the feature that their storage and switching zones are positively coupled together, thereby eliminating the disadvantages of negatively coupled films as mentioned hereinabove. It should be noted also that where storage and switching zones are provided by the presence or absence in such zones of hardening means (such as overlying strips of high-anisotropy material, or diffused hardening agents, or microscopic protuberances on the substrate) in accordance with the invention, the extent of such hardening effects is accurately controlled and precisely selected beforehand, so that the various zones are geometrically well defined in a predetermined pattern rather than being disposed merely by chance in a random arrangement of hard and soft spots throughout the cell. This is a decided advantage over prior magnetic film cells in which positive coupling and interruptions of such coupling are randomly distributed in an uncontrolled manner within each cell.

While the invention has been particularly shown and described with reference to preferred embodiments thereof, it will be understood by those skilled in the art that various changes in form and details may be made therein without departing from the spirit and scope of the invention.

What is claimed is:

1. A magnetic film cell for use in a data store of the type which operates in an orthogonal switching mode, said cell comprising:

a layer of magnetizable material having a first axis along which the magnetization of said layer normally is directed and having a second axis transverse to said first axis along which said layer can be magnetized temporarily to rotate the magnetization thereof away from said first axis toward said second axis, said layer having a plurality of distinct zones arranged side by side in a predetermined manner along said first axis so that the boundary between each adjacent pair of said zones is crossed by said first axis, said zones being magnetically coupled in such a way that their respective magnetizations tend to be aligned parallel with said first axis and uniformly directed;

and hardening means intimately associated with said layer of magnetizable material in at least a predetermined one of said zones but not in any of said zones immediately adjoining such a predetermined zone for thereby causing the magnetizable material in said predetermined zone or zones to have magnetic properties different from those of any said adjoining zone, whereby the several zones differ in the transverse magnetic field strength required to rotate their respective magnetizations away from said first axis.

2. A magnetic film cell according to claim 1 wherein said hardening means comprises a second layer of magnetizable material having an anisotropy value higher than that of the material contained in the first said layer, said two layers being in an exchange-coupled relationship with each other in only that predetermined zone or zones wherein the magnetic field strength required to rotate the magnetization thereof is selected to exceed the magnetic field strength which is required to rotate the magnetization of an adjoining zone or zones.

3. A magnetic film storage device with nondestructive readout comprising:

a magnetic film cell of the kind specified in claim 1; and reading means for momentarily applying to all zones of said cell a magnetic field directed substantially along said second axis and being of such magnitude and duration that it rotates through approximately ninety degrees the magnetization of each of the unhardened zones, without rotating by any comparable amount the magnetization of any of the hardened zones, whereby said hardened zones serve to restore the magnetizations of all zones to their original direction along said first axis when said magnetic field terminates.

References Cited

UNITED STATES PATENTS

| | | | |
|---|---|---|---|
| 3,213,431 | 10/1965 | Kolk et al. | 340—174 |
| 3,230,515 | 1/1966 | Smaller | 340—174 |
| 3,366,937 | 1/1968 | Fuller | 340—174 |
| 3,370,979 | 2/1968 | Schmeckenbecher | 340—174 |

TERRELL W. FEARS, Primary Examiner

BARRY L. HALEY, Assistant Examiner